Figure 1:
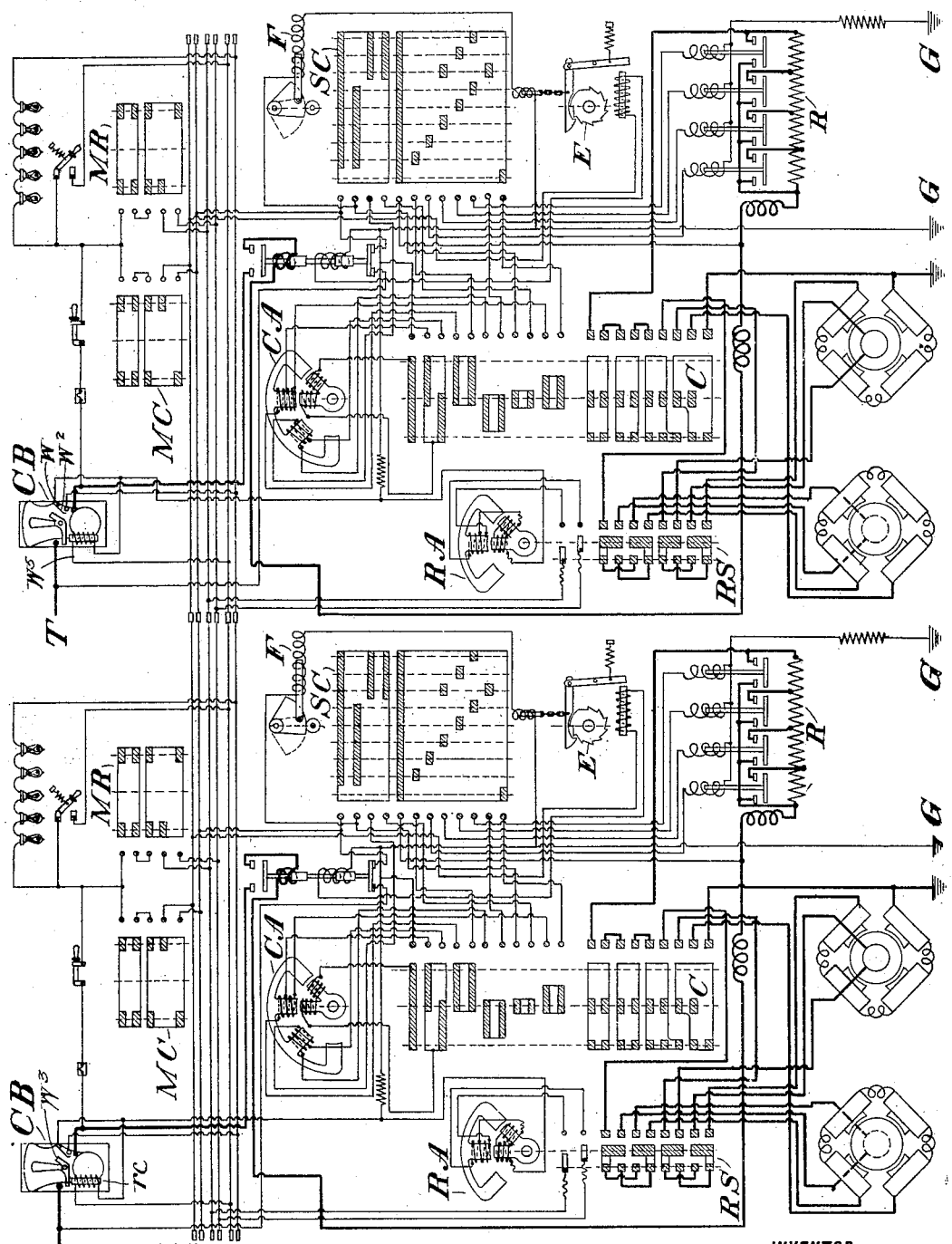

No. 665,143. Patented Jan. 1, 1901.
E. W. STULL.
CONTROL OF ELECTRIC MOTORS.
(Application filed June 5, 1900.)
(No Model.) 3 Sheets—Sheet 1.

WITNESSES:
G. M. Powell.
Blanche M. Smith.

INVENTOR
E. W. Stull
BY
Geo. H. Parmelee,
his ATTORNEY.

No. 665,143. Patented Jan. 1, 1901.
E. W. STULL.
CONTROL OF ELECTRIC MOTORS.
(Application filed June 5, 1900.)
(No Model.) 3 Sheets—Sheet 2.

WITNESSES:
G. M. Powell
Blanche M. Smith

INVENTOR
E. W. Stull,
BY Geo. H. Parmelee,
his ATTORNEY.

No. 665,143. Patented Jan. 1, 1901.
E. W. STULL.
CONTROL OF ELECTRIC MOTORS.
(Application filed June 5, 1900.)
(No Model.) 3 Sheets—Sheet 3.
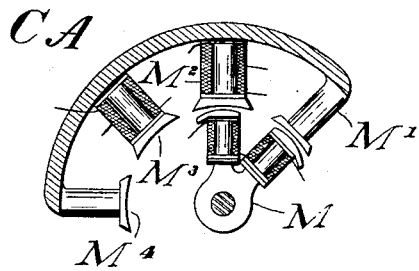
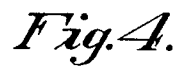
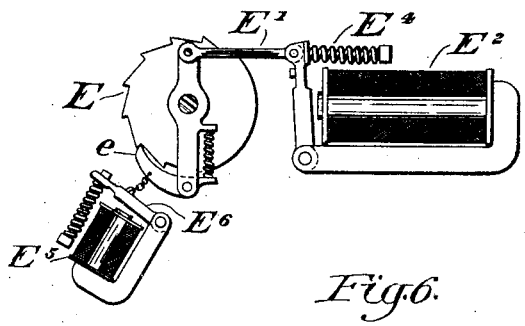
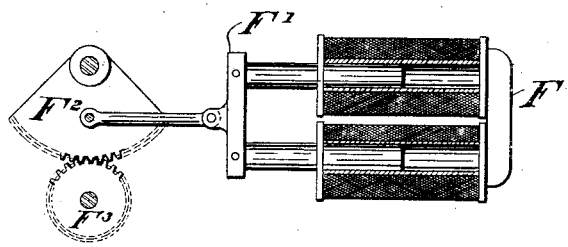
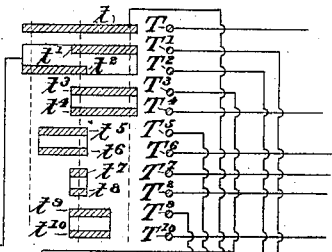
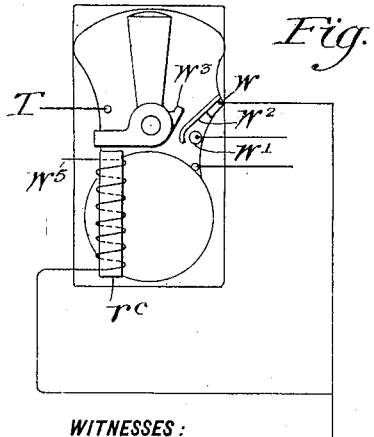
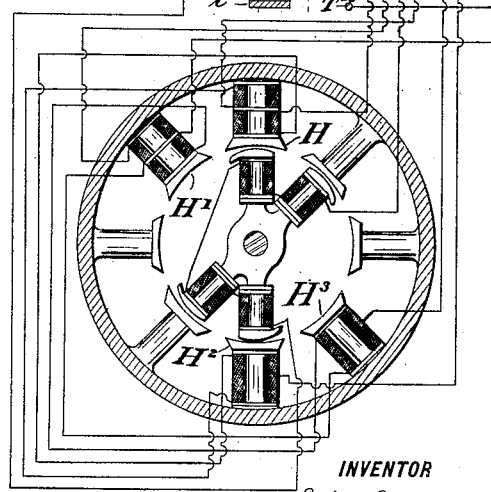
WITNESSES:
G. W. Powell.
Blanche M. Smith
INVENTOR
E. W. Stull,
BY
Geo. H. Parmelee,
his ATTORNEY.
THE NORRIS PETERS CO., PHOTO-LITHO., WASHINGTON, D. C.

United States Patent Office.

EMMETT W. STULL, OF JOHNSTOWN, PENNSYLVANIA, ASSIGNOR TO THE LORAIN STEEL COMPANY, OF PENNSYLVANIA.

CONTROL OF ELECTRIC MOTORS.

SPECIFICATION forming part of Letters Patent No. 665,143, dated January 1, 1901.

Application filed June 5, 1900. Serial No. 19,137. (No model.)

*To all whom it may concern:*

Be it known that I, EMMETT W. STULL, of Johnstown, in the county of Cambria and State of Pennsylvania, have invented a new and useful Improvement in Control of Electric Motors, of which the following is a full, clear, and exact description, reference being had to the accompanying drawings, which form a part of this specification.

My invention has relation to the control of electric motors, and is particularly designed for use in connection with the motors of electrically-propelled trains composed of a number of vehicles or cars each of which has its own individual propelling-motors.

The invention is designed to provide means of novel and efficient character whereby the motors of the cars can be controlled in unison from any desired point on the train. It is also designed to provide a system of this character in which the number of train-wires is reduced to a minimum; also, to provide in such a system means which will protect the motors from injury by reason of a sudden inrush of current following a failure of current from any cause.

A further object is to provide means whereby the car-circuit breakers throughout the train may be automatically reset from any desired point on the train, and also means for indicating to the motorman the fact of an open-circuit breaker on any car.

Generally considered, my invention consists in the combination, with motor-controllers and means for actuating the same to control the circuit relations of the motors, of a master-controller which primarily governs the operation of the motor-controller, and a submaster-controller on each car whose operation is controlled by the master-controller and which immediately controls the motor-controller actuator and also the connection in the motor-circuit of external resistance. This submaster-controller forms an important feature of my system of control, its purpose being to perform to a large extent the work which has heretofore been done by the master-controller. The master-controllers throughout the train being connected in multiple between the train-wires, it is obvious that for each operative position of the master-controller there must be corresponding train-wires, and in all systems of train control which have heretofore been proposed, in so far as known by me, the master-controller is arranged to have an operative position for each of the several positions of the motor-controllers. As it is necessary for the latter to have a considerable number of positions in changing the motors from their starting positions to their full-running positions, a very considerable number of train-wires has usually been required. By the use of the sub-master-controllers as herein proposed I am enabled to reduce the master-controller to a very simple form of switch having but two operating positions and requiring but two train-wires.

The invention also comprises a motor-reversing switch, actuators therefor, and a master reversing-switch, which control the said actuator, also switches for cutting into and out of circuit, more or less, of artificial resistance to properly regulate the speed and acceleration of the motors.

The invention also comprises a novel arrangement of switches for automatically opening the motor-circuits upon failure of the supply-circuit and for automatically restoring such circuits upon resumption of the current and the return of the motor-controllers to a position to properly condition the motors to again receive current.

The invention also consists in the combination, with circuit-breakers throughout the train on the respective cars, of switches and connections whereby said circuit-breakers or any one of them may be reset from the selected point of control. I also provide signals and means whereby the same are operated automatically by the opening of any circuit-breaker throughout the train.

My invention also consists in various constructions, arrangements, combinations, and subcombinations of parts and devices, all as fully hereinafter described, and pointed out in the appended claims, reference being had to the accompanying drawings, forming a part of this specification.

Figure 2:
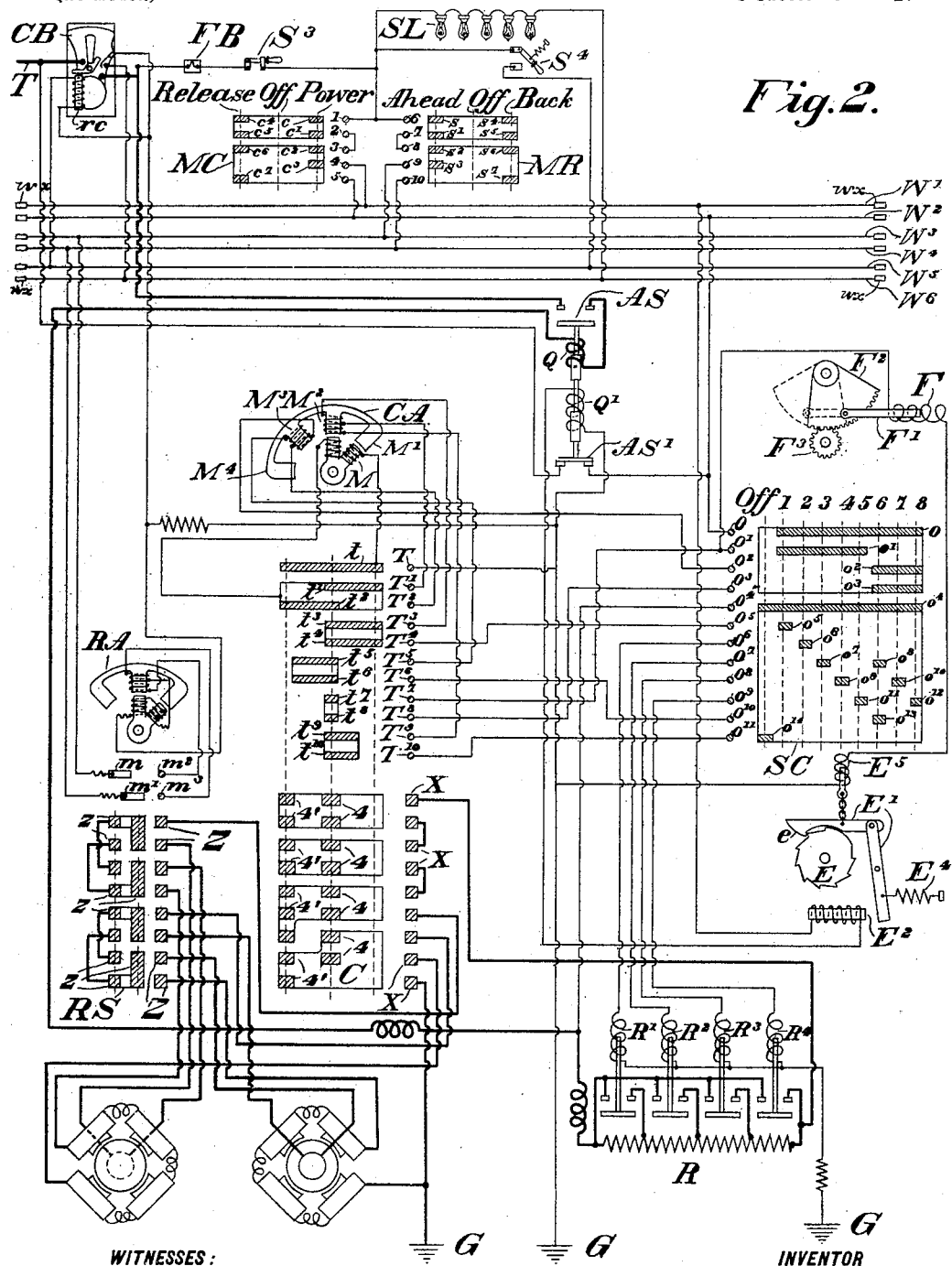

In the drawings, Figure 1 is a diagram illustrating a general arrangement of parts and electric connections suitable for use in applying my invention to a train composed of two cars. Fig. 2 is a similar view showing, on a larger scale, the arrangement of parts and connections for one of the cars. Fig. 3 is a detail view of the actuator for one of the motor-controllers. Fig. 4 is a plan view of an actuating device for one of the submaster-controllers. Fig. 5 is a similar view showing means for returning the submaster-controller to its off position. Fig. 6 is a view showing a modification of the motor-controller actuator, and Fig. 7 is a diagrammatic view showing, on a larger scale, one of the circuit-breakers.

In Figs. 1 and 2 in order that the motor-circuits and the controller-circuits may be more readily distinguished and followed I have represented the connections of the former by heavier lines.

The arrangement and connection of parts being the same on each car, it will be sufficient to confine the detailed description to a single car, and to this end especial reference will now be had to Fig. 2.

The letter T indicates the connection leading to the high-pressure side of the supply system, and G whenever seen indicates a ground connection.

C indicates the motor-controller, which I have shown as being of the well-known series-parallel type, its rotary drum having thereon one set of contacts 4 for connecting the two motors in series and a second set $4'$ for connecting them in parallel, said contacts being engaged by a series of fixed contact-fingers X.

RS is the motor-reversing switch, which is also of well-known type, its contacts $z$ being mounted upon a rotary drum and engaged by a series of contact-fingers Z. It is not thought necessary to describe in detail the various connections between the controller, the reversing-switch, and the motors, as this forms no part of my invention, and is, moreover, best understood by reference to the diagram.

CA is an actuator for the controller C and consists of two oppositely-wound electromagnets M, secured to the shaft of the controller-drum to rotate therewith, and a fixed magnet adjacent thereto having a plurality of inwardly-projecting radial pole-pieces $M'$ $M^2$ $M^3$ $M^4$. The two middle poles $M^2 M^3$ are wound with coils; but the poles $M'$ $M^4$ are unwound, being consequent poles.

The manner in which the magnet-coils are connected in circuit will be described hereinafter.

RA designates the reverse-switch actuator, which is similar to the actuator CA, except that its fixed magnet has but three poles, only one of which is wound.

MC is the master-controller, which in the present instance is shown as consisting of a rotary member carrying contacts designed to be engaged by contact-fingers. The controller has a "power" position, a "release" position, and an "off" position. In its power position contacts $c\ c'\ c^2\ c^3$ are engaged by fingers 1, 2, 3, and 4, and in its release position contacts $c^4$, $c^5$, $c^6$, and $c^7$ are engaged by fingers 1, 2, 3, and 5. In its off position no contacts are engaged.

MR is the master reverse-switch, which is a duplicate of the master controlling-switch. This switch has an "ahead" position, in which its contacts $s$, $s'$, $s^2$, and $s^3$ are engaged by its respective fingers 6, 7, 8, and 9, a "back" position, in which its contacts $s^4$, $s^5$, $s^6$, and $s^7$ are engaged by the respective fingers 6, 7, 8, and 10, and an intermediate off position, in which no contacts are engaged.

SC designates the submaster-controller, which is also a rotary drum having a series of peripheral contacts and coöperating fixed contact-fingers. This controller may, if desired, be placed in the same case with the motor-controller, but it is actuated independently of the latter and is not mechanically connected therewith. Various means may be employed for actuating this drum to impart a step-by-step forward movement thereto. The means which I have shown consist of a ratchet E, fixed to the shaft of the drum, a compound armature and pawl-lever $E'$, whose pawl $e$ engages the teeth of said ratchet, an electromagnet $E^2$ for actuating said pawl-lever to cause a step movement of said ratchet, and a retracting spring $E^4$ for retracting said lever. (See Fig. 4.)

$E^5$ is an electromagnet whose armature $E^6$, when attracted, is designed to withdraw the pawl $e$ from engagement with the teeth of the ratchet E.

For the purpose of returning the controller SC to off position when the pawl $e$ is disengaged I have shown an electromagnet F, whose armature $F'$ is connected to a pivoted toothed sector $F^2$, which meshes with a pinion $F^3$ on the shaft of the drum.

Electrically considered, the drum SC is composed of two parts, one of which is comprised by contacts $o\ o'\ o^2\ o^3$, with corresponding contact-fingers O $O'$ $O^2$ $O^3$, and the other part by the contacts $o^4$ to $o^{14}$, inclusive, and their corresponding fingers $O^4$ to $O^{14}$. In the arrangement shown, the drum SC has eight operative positions, as indicated by the broken vertical lines.

R designates artificial resistance for connection in the motor-circuit. This resistance is arranged in sections which are designed to be successively removed from or included in the other circuit by means of switches $R'$, $R^2$, $R^3$, and $R^4$, operated by solenoids and controlled by the submaster-controller, as hereinafter described.

$t\ t'$, &c., to and including $t^{10}$, designate a group of contacts which are carried by the motor-controller drum, being supplemental to the motor-regulating contacts. T to $T^{10}$, inclusive, designate the corresponding contact-fingers. The relative arrangement of these contacts to each other, to the motor-controlling contacts, and with respect to the different positions of the motor-controller will be best understood by reference to the diagram.

$W'$, $W^2$, $W^3$, $W^4$, $W^5$, and $W^6$ indicate six train-wires which extend throughout the train, being provided with suitable couplings $wx$ between cars. The master-controllers throughout the train are connected in multiple between the wires $W'$ $W^2$, and all the master reverse-controllers are similarly connected between the wires $W^3$ and $W^4$. The car circuit-breakers CB are of that type which can be reset by energizing an electromagnet. The resetting-coils $cr$ of these circuit-breakers are each connected to the train-wire $W^5$ upon one side and upon the other side are connected to ground. Each circuit-breaker is also provided with two normally-separated contacts $w$ $w'$, contact $w$ being connected to ground and contact $w'$ being connected to the train-wire $W^6$. Attached to the terminal $w$ is a spring bridging-piece $w^2$, which is moved to make connection with the contact $w'$ by a lug $w^3$ on the handle or movable member of the circuit-breaker when the latter is in open position. The circuit-breaker of each car is interposed in the motor-circuit between the trolley connection TC and the motor-controllers, and the controlling-circuits are derived from the motor-circuit from points on the car side of the circuit-breakers, the controlling-circuit connection leading to the master-controller through a fuse-box FB, and a switch $S^3$ then in multiple to the fingers 1 and 6 of the master-controller and the master reverse-switch. A branch conductor leads to the train-wire $W^6$ through signal-lamps SL, and still another branch leads to the train-wire $W^5$ through a switch $S^4$, which is normally in open position.

An automatic cut-out switch AS is also interposed in the motor-circuit between the circuit-breaker and the motor-controller, whose movable member is actuated by a solenoid having one coil Q in the motor-circuit and a second coil $Q'$ in the controlling-circuit. This solenoid also operates a second connected switch AS', which is interposed in a conductor leading from the trolley side of the circuit-breaker to the first finger $o$ of the submaster-controller, the arrangement being such that when the switch AS is open switch AS' is closed, and vice versa.

Contact-fingers 2 and 3 of the master controlling-switch MC are connected with each other. Finger 4 is connected to train-wire $W'$ and finger 5 to train-wire $W^2$. Fingers 7 and 8 of the master reverse-switch are connected to each other, and fingers 9 and 10 are respectively connected to the train-wires $W^3$ and $W^4$. Finger O is connected to the train-wire $W^2$ and also to one terminal of the switch AS', as above stated. Finger O' is connected to finger $T^7$. $O^2$ is connected to finger $T^2$ through one-half of the coil of the magnet $M^3$. $O^3$ is connected with finger $T^8$. Finger $O^4$, which maintains a constant engagement with contact $o^4$, is connected to the motor-circuit at a point intermediate the switch AS and the resistance R, whereby the circuits controlled by the lower group of contacts of the submaster-controller may receive current independently of the master-controller. Finger $O^5$ is connected to finger $T^4$. Fingers $O^6$, $O^7$, $O^8$, and $O^9$ are connected to ground through the respective solenoid-coils $R'$, $R^2$, $R^3$, and $R^4$. Finger $O^{11}$, which has no engagement except when the submaster-controller is in off position, is connected to finger $T^{10}$.

Train-wire $W'$ is connected to ground through the coil $E^2$ of the submotor-controller actuator and also through the solenoid-coil $Q'$. The coils of the magnet $E^5$ and F are connected in series with each other in a branch circuit, which is connected at one end with the connection leading from the finger O' and at the other end to ground through the solenoid-coil $Q'$.

One half of magnet-coil $M^3$ is connected between the fingers $O^2$ $T^2$, as above stated. The other half is connected to finger $T^5$. The magnet-coil $M^2$ is respectively connected to the fingers $T^3$ $T^9$ and the middle portion of the coil is connected to finger $T'$. The coils of the two movable magnets M are connected in series between the contacts $t$ and the castings carrying the contacts $t'$ $t^2$. The two movable coils of the reverse switch-actuator RA are connected in series with each other and with ground on the one side. On the other side they are connected to the middle portion of the coil of the fixed magnet of said actuator, and the two ends of the said coil are respectively connected to the train-wires $W^3$ $W^4$ through contacts $m$ $m'$ on the shaft of the reverse-switch RS, which are respectively designed to be engaged by contact-fingers $m^2$ $m^3$, contact $m'$ being engaged by its finger $m^3$ when the reverse-switch is in ahead position and contact $m$ by its finger $m^2$ when the reverse-switch is in back position.

I will now proceed to describe the manner in which my system of control operates.

Supposing all the controllers to be at off position, the circuit-breakers closed, switches AS open, and the switches $S^3$ to be open on all the cars except that from which the contact is to be effected and it being desired to start the car ahead, the reverse-switch being set to ahead position the motorman first throws the master-controller to power position and then brings it back to its off position. A circuit is thereby temporarily completed through the finger 1, contacts $c$ $c'$, fingers 2 and 3, contacts $c^2$ $c^3$, finger 4 to train-wire $W'$, to and through the magnet-coils $E^2$ and solenoid-coil $Q'$ to ground, thereby causing the magnet $E^2$ to turn the submotor-controller one step to its first position and the coil $Q'$ to close the switch AS. Up to this time there has been no movement of the motor-controller; but as soon as the submaster-controller reaches its first position the engagement of the finger $O^4$ with the contacts $o^4$ $o^5$ completes a circuit to the finger $T^4$ and through contacts $t^3$ $t^4$ and finger $T^3$ to and through the outer half of the magnet-coil $M^2$, thence back to finger T', to contacts $t'$ $t^2$, to and through the two magnets M, to contact $t$, and to finger T to ground. Magnets M' and M² will thereby be given opposite polarities and the magnets M will be given polarities respectively opposite to those of M' and M², and the combined effect of the resulting attraction and repulsion upon the magnets M moves the latter, and thereby rotates the motor-controller to its series position. The magnets M will now be respectively opposite the poles of magnets M² M³ and will have no tendency to further movement. It is obvious that the submaster-controllers and the motor-controllers will all have a similar action, and the motors of each car will be connected in series with each other and with all the resistance R. The circuits will now remain unchanged until the master-controller is again operated as before, which will cause the subcontroller to be moved to position 2. In this position finger $O^5$ has lost its engagement with contact $o^5$ and finger $O^6$ has engaged contact $o^6$. This energizes the solenoid-coil of resistance-switch R' and short-circuits one section of the resistance R. Successive operations of the master-controller successively advance the subcontrollers to positions 3, 4, and 5, and by the resulting successive action of the switches R² R³ R⁴ the resistance is gradually and finally at position 5 entirely short-circuited. The next operation of the master-controller will advance the subcontroller to position 6, which will engage finger $O^{10}$ with contact $o^{13}$, and also the finger $O^7$ with the contact $o^8$. The engagement of finger $O^{10}$ with contact $o^{13}$ closes a circuit through the outer half of the magnet-coil M³ and through the coils of both magnets M to ground, the circuit being through finger $T^6$, contacts $t^6$ $t^5$, finger $T^5$, to magnet-coil M³, to finger $T^2$, contact $t^2$, and to and through magnets M. This causes another movement of the motor-controller to a point where the magnets M are respectively opposite the poles of the magnets M³ M⁴, which is the parallel position of said controller. The engagement of the contact $o^8$ will short-circuit two sections of the resistance R, which would otherwise be again entirely in circuit. Two more successive operations of the master-controller will short-circuit successively the remaining sections of resistance through the engagement of the contacts $o^{10}$ and $o^{12}$ by the fingers 8 and 9.

To release and return to off position, the motorman throws the master-controller over to its indicated release position. This sends current into the wire $W^2$, thence to finger O, contacts $o$ $o^2$, finger $O^2$, to and through the inner half of the magnet-coil M³, to finger $T^2$, to contacts $t'$ $t^2$, to and through magnets M, to contact $t$, and to ground. As the current passes through the inner half of the coil M³ in the opposite direction to that in which it passed in the outer half in moving the motor-controller to parallel, the polarity of magnets M³ M⁴ is reversed and the motor-controller is moved back to series position. As soon as this occurs current passes from the contact $o^3$ to finger $O^3$, to finger $T^3$, to contacts $t^8$ $t^7$, to finger $T^7$, to and through the release-magnet coil F, and also the pawl-releasing magnet $E^5$ to ground, thus causing the return of the submaster-controller to off position. When this position is reached, the finger $O^{11}$ engages the contact $o^{14}$ and sends current to finger $T^{10}$, contacts $t^{10}$ $t^9$, finger $T^9$, to and through the inner half of magnet-coil M², to finger T', contacts $t'$, to and through magnets M, to contact $t$, and finger T to ground. This, as will be readily seen, will cause the motor-controller to return to off position. The release action will be that just described when the submaster-controller is in either positions 6, 7, or 8. If the motor-controller is in series position, when it is desired to release with the subcontroller in any one of its positions 2, 3, 4, and 5 current will pass directly from the contact $o'$ and finger $O'$ to and through the release-magnet coils, causing the return of the subcontroller to off position, when the contact $o^{14}$ comes into play to cause the return of the motor-controller to its off position, as before.

The operation of the reversing-switches will be readily understood. When the master reverse-switch is moved to ahead position, current is sent into the train-wire $W^3$, and from thence to the contact devices $m$ $m^2$, to and through the inner half of the fixed coil of the reverse switch-actuator RA, and thence through the coils of its movable magnets to ground. The resulting relative energization of the magnets effects the movement of the reverse-switch to ahead position. If the master reversing-switch is moved to back position, current is sent to train-wire $W^4$, thence to contact devices $m'$ and $m^3$, to and through the outer half of the fixed magnet-coil, and to ground through the coils of the movable magnet. This reverses the polarity of the fixed magnets and causes the reverse-switch to be moved to back position. By the described arrangement of the contact devices $m$ $m'$ $m^2$ $m^3$ I prevent current being uselessly drawn through the magnet-coils when the actuator is idle.

In case of failure of current at any time the switch AS will automatically open and switch AS' will automatically close. When the current-supply is resumed, current will enter the controlling-circuit by the described connection from the line side of the circuit-breaker and thence to the upper group of contacts of the submaster-controller. The controllers will now be automatically returned to off position in the same manner as above described, no matter in what position they may be. Operation of the master-controller will now close the switch AS and restore the motor-circuit.

If the circuit-breaker on the car where the motorman is stationed opens, he will of course be aware of the fact; but it is desirable to provide some means which will notify him when a circuit-breaker on any other car opens. This will be done as follows: When the circuit-breaker on any of the other cars opens, it will close the circuit between the contacts $w$ $w'$ of that circuit-breaker, and inasmuch as contact $w$ is ground-connected a circuit will at once be established to ground through the signal-lamps on the car where the motorman is stationed. It will be readily seen that the opening of any circuit-breaker except the one on that particular car will light these lamps, since it will provide a ground connection for the lamp-circuit whose other side is connected to the controlling-circuit. The circuit-breaker on the motorman's car can be readily reset by hand; but to enable those on the other cars to be automatically reset I provide the switch $S^4$, which is normally held open by a spring. By closing this switch circuit is closed through the resetting-coils of the various circuit-breakers, as will be readily seen.

Fig. 6 shows a modified form of controller-actuator designed to provide greater power than that above described. In this form the shaft of the motor-controller is provided with four poles and coils instead of two, arranged in opposite pairs, and the frame of the fixed field-magnet has eight poles instead of four, four of these poles $H$ $H'$ $H^2$ $H^3$ having coils and the other four being consequent poles. The coils of the four movable poles are all connected in series between the contacts $t$, $t'$, and $t^2$. The poles $H$ and $H'$ each have two separate oppositely-wound coils, while the poles $H^2$ $H^3$ have one coil each, with connections whereby current may be sent through the respective halves of each coil in opposite directions. The inner coil of the pole-piece $H'$ and the inner half of the diametrically opposite coil on pole-piece $H^3$ are connected in series between fingers $O^2$ and $T^2$. The outer half of $H^3$ and the outer coil of $H'$ are connected in series between finger $T^2$ and finger $T^5$. The middle portion of the coil $H^2$ is connected to finger $T$ and its inner end to the inner end of the inner coil $H$, whose outer end is connected to finger $T^9$. The outer end of $H^2$ is connected to the outer end of the outer coil $H$, whose inner end is connected to finger $T^3$.

It will be readily understood that in case a motor-controller is employed having more than two positions the necessary movements thereof may be obtained by increasing correspondingly the number of fixed magnets with corresponding contacts and connections for effecting the proper energization of the same.

In order to show a complete embodiment and application of my invention, I have necessarily shown many details which are not essential thereto, being susceptible of considerable variation without in any way affecting its spirit and scope. Hence I do not desire to be limited to such details.

Having thus described my invention, what I claim, and desire to secure by Letters Patent, is—

1. In a system of electric train control, the combination of a master-controller, a submaster-controller governed by the master-controller, and a motor-controller governed by the submaster-controller.

2. In a system of electric train control, the combination of a master-controller, a submaster-controller, a submaster-controller-actuating device governed by the master-controller, and a motor-controller governed by the submaster-controller.

3. In a system of electric train control, the combination of a master-controller, a submaster-controller, a submaster-controller-actuating device governed by the master-controller, a motor-controller, and a motor-controller-actuating device governed by the submaster-controller.

4. In a system of electric train control, the combination of a master-controller, a submaster-controller governed by the master-controller, and a motor-controller governed by the submaster-controller, said submaster-controller and motor-controller being mechanically independent of each other.

5. In a system of electric train control, the combination of a master-controller, a submaster-controller governed by the master-controller, and a motor-controller governed by the submaster-controller, said submaster-controller having circuit connections independently of the master-controller.

6. In a system of electric train control, the combination of a motor-controlling switch, an actuator therefor, a mechanically-independent switch for controlling the said actuator, and a master controlling-switch for governing said independent switch.

7. In a system of electric train control, the combination of a motor-controlling switch, an electromagnetic actuator therefor, a mechanically-independent switch for controlling said actuator, an actuator for said independent switch, and a master controlling-switch for governing the last-named actuator.

8. In a system of electric train control, the combination of a motor-controlling switch, an electromagnetic actuator therefor, a switch mechanically independent of the motor-controlling switch for governing said actuator, an electromagnetic actuator for said independent switch, and a master-controller for governing the last-named actuator, and circuit connections for supplying current to the independent switch independently of the supply controlled by the master controlling-switch.

9. In a system of electric train control, the combination of a motor-controlling switch, an electromagnetic actuator therefor, circuit connections for energizing the magnets of said actuator, a switch which controls the said connections, an actuator for said switch, and a master-switch for controlling the operation of the last-named actuator.

10. In a system of electric train control, the combination of a motor-controlling switch, an electromagnetic actuator for said switch, a mechanically-independent switch for controlling the said actuator, an actuator for moving said independent switch in one direction, a second actuator for moving it in the opposite direction, and a master controlling-switch for governing the said actuators.

11. In a system of electric train control, the combination of a motor-controller, an actuator for said controller, a mechanically-independent controller for governing the said actuator, electromagnetic devices for actuating the independent controller to a step-by-step forward movement and a continuous return movement, and a master-controller which governs the operation of said devices.

12. In a system of electric train control, the combination with the propelling-motors of each car, external resistance for connection in circuit therewith, a motor-controller for connecting said motors either in series or in parallel, switches for short-circuiting more or less of said resistance, an actuator for the motor-controller, actuators for the resistance-switches, a submaster controlling-switch for governing the operation of all the said actuators, an actuating device for said submaster controlling-switch, and a master-switch for controlling the operation of the last-named actuating devices.

13. In a system of electric train control, the combination with motor-controlling and resistance switches, together with electromagnetic actuating devices therefor, of a controller for the said devices, electromagnetic actuating devices for the said controller, and a master controlling-switch having contacts and circuit connections for energizing said actuating devices to operate said controller to either forward or backward movement.

14. In a system of electric train control, the combination with two conductors extending throughout the train, of master-controllers located at different points throughout the train and connected in multiple between said conductors, propelling-motors on the several cars and operating-circuits therefor, controllers for the said motors, actuating devices for said controllers, submaster-controllers for governing said actuating devices, and actuating devices for said submaster-controllers, governed by said master-controllers.

15. In a system of electric train control, the combination with propelling-motors, their circuits and controllers, the latter having contacts supplemental to its motor-controlling contacts, of actuating devices for said controllers, a submaster-controller for each motor-controller, which, together with the contacts of said supplemental group, control the said actuating devices, actuating devices for said submaster-controller, and master-controllers at different points on the train having contacts and connections whereby the operation of any master-controller will close the circuit of the last-named actuating devices.

16. In a system of electric train control, the combination with a motor-controller, external resistance for connection in circuit with the propelling-motors, and switches for removing from the motor-circuit more or less of said resistance, of an actuator for said controller, a controller which governs the operation of the motor-controller at some of its positions and at other positions effects certain operations of the resistance-switches, actuating devices for the last-named controller, and means for controlling the operation of said actuating devices from a plurality of points on the train.

17. In a system of electric train control, the combination with a motor-controller, having a rotary member carrying contacts for effecting circuit changes of the motors, and also supplemental contacts, an electromagnetic actuator for said rotary member, a submaster-controller having contacts which coöperate with the said supplemental contacts to control the operation of said actuator, means for actuating the submaster-controller to a step-by-step forward movement, and a continuous return movement, and means for controlling the operation of said actuating devices from different points throughout the train.

18. In a system of electric train control, the combination with the propelling-motors of a car, and a switch for controlling the same, of an actuating device for said switch, having a plurality of coöperating magnets, switch mechanism for controlling the energization of said magnets, electromagnetic actuating devices for said switch mechanism, and means for controlling said actuating devices from any desired point on the train.

19. In a system of electric train control, the combination with a motor-controller, of an actuating device therefor, consisting of a pair of movable oppositely-wound electromagnets operatively connected to said controller, means for energizing said magnets, and a plurality of fixed magnets having poles adjacent to those of the movable magnets, and means for energizing said fixed magnets in pairs whose individual magnets are of opposite polarity, and means for reversing such polarity.

20. In a system of electric train control, the combination with the propelling-motors of each car, and a controlling-switch for said motors, of a motor-reversing switch having a rotary contact-carrying member, and an electromagnetic actuator therefor, consisting of a pair of oppositely-wound electromagnets secured to said contact-carrying member, and three coöperating fixed magnets, together with means for energizing the middle one of said magnets together with either of the adjacent magnets, to give the two magnets energized opposite polarity, and also means for reversing the relative polarity of the said magnets.

21. In a system of electric train control, the combination with the propelling-motors of each car, controllers for said motors, and actuating devices for said controllers, of a switch for controlling said actuating devices, an electromagnetically-operated device for imparting a step-by-step movement to the movable member of said switch in one direction, an electromagnetically-operated release device for said switch, an electromagnetically-operated return actuating device for said switch, and a master-switch which controls the operation of all of said electromagnetically-operated devices.

22. In a system of electric train control, the combination with the propelling-motors of each car, the controller for said motors its actuator, a switch for controlling the operation of said actuator, actuating devices for said switch, and a master-switch for controlling the operation of said actuating devices, of a circuit-breaker arranged to open the motor-circuit and the circuit of the master-controller, but not the circuit to the motor-controller actuator and to the return actuating device of the submaster-controller, and a double switch one part of which is arranged to open and close the motor-circuit between the circuit-breaker and the motors and the other part of which is arranged to open and close a circuit to the motor-controller actuator, together with means for actuating said switch under predetermined circuit conditions.

23. In a system of electric train control, the combination with the propelling-motors of each car, a controller therefor, an actuator for said controller, controlling devices for said actuator, an actuator for said controlling devices, and a master-switch for controlling the last-named actuator, of a circuit-breaker for automatically opening the supply-circuit to the motors and also the circuit to the master-switch, a circuit connection to the last-named actuator independent of the circuit-breaker and master-switch, a double switch one portion of which is arranged to open and close the motor-circuit at a point between the circuit-breaker and the motors, and the other portion of which is arranged to open and close the said circuit connection, and means for automatically operating said switch under predetermined circuit conditions to open one portion thereof and close the other portion.

24. In a system of electric train control, the combination with the motor and the motor-circuits of each car, of a motor-controller, an electromagnetic actuating device therefor, controlling mechanism for said actuating device arranged to control the current-supply to said actuator and for varying the internal circuits of the same to produce a step-by-step movement of the controller, and an automatic switch arranged to open the motor-circuit upon the failure of current thereto, and at the same time to close a circuit to the said actuating device.

25. In a system of electric train control, the combination with the motor and the motor-circuits of each car, of a motor-controller, an electromagnetic actuating device therefor, controlling mechanism for said actuating device arranged to control the current-supply to said actuator and for varying the internal circuits of the same to produce a step-by-step movement of the controller, and an automatic switch arranged to open the motor-circuit upon the failure of current thereto, and at the same time to close a circuit to the said actuating device, together with means for closing said switch upon resumption of the current-supply, said means operating only when the motor-controller is at off position.

26. In a system of electric train control, an automatic switch arranged to open the motor-circuit upon failure of current in said circuit, and simultaneously therewith to close a circuit to the motor-controller-actuating mechanism, and means for causing a reverse operation of said switch said means being operative only when the motor-controller is at off position.

27. In a system of electric train control, the combination with circuit-breakers arranged in multiple throughout the train and having automatic resetting devices, of a switch on each car arranged to close the circuit of said resetting devices.

28. In a system of electric train control, a pair of conductors extending throughout the train, a circuit-breaker on each car, said circuit-breakers being connected in multiple between said conductors, signals on the cars, and means operated by the opening of any circuit-breaker for closing circuit through the said signals.

29. In a system of electric train control, the combination with a motor-controller having contacts for varying the circuit connections of the motors, and also supplemental contacts, an electromagnetic actuator for said motor-controller, a submaster-controller having contacts and connections which coöperate with the said supplemental contacts to vary the internal connections of the actuator, actuating devices for said submaster-controller, and master-switches one of which controls the actuating device which moves the submaster-controller in one direction and the other of which controls the actuating device which moves the submaster-controller in the opposite direction.

In testimony whereof I have affixed my signature in presence of two witnesses.

EMMETT W. STULL.

Witnesses:
BLANCHE M. SMITH,
H. W. SMITH.